United States Patent Office

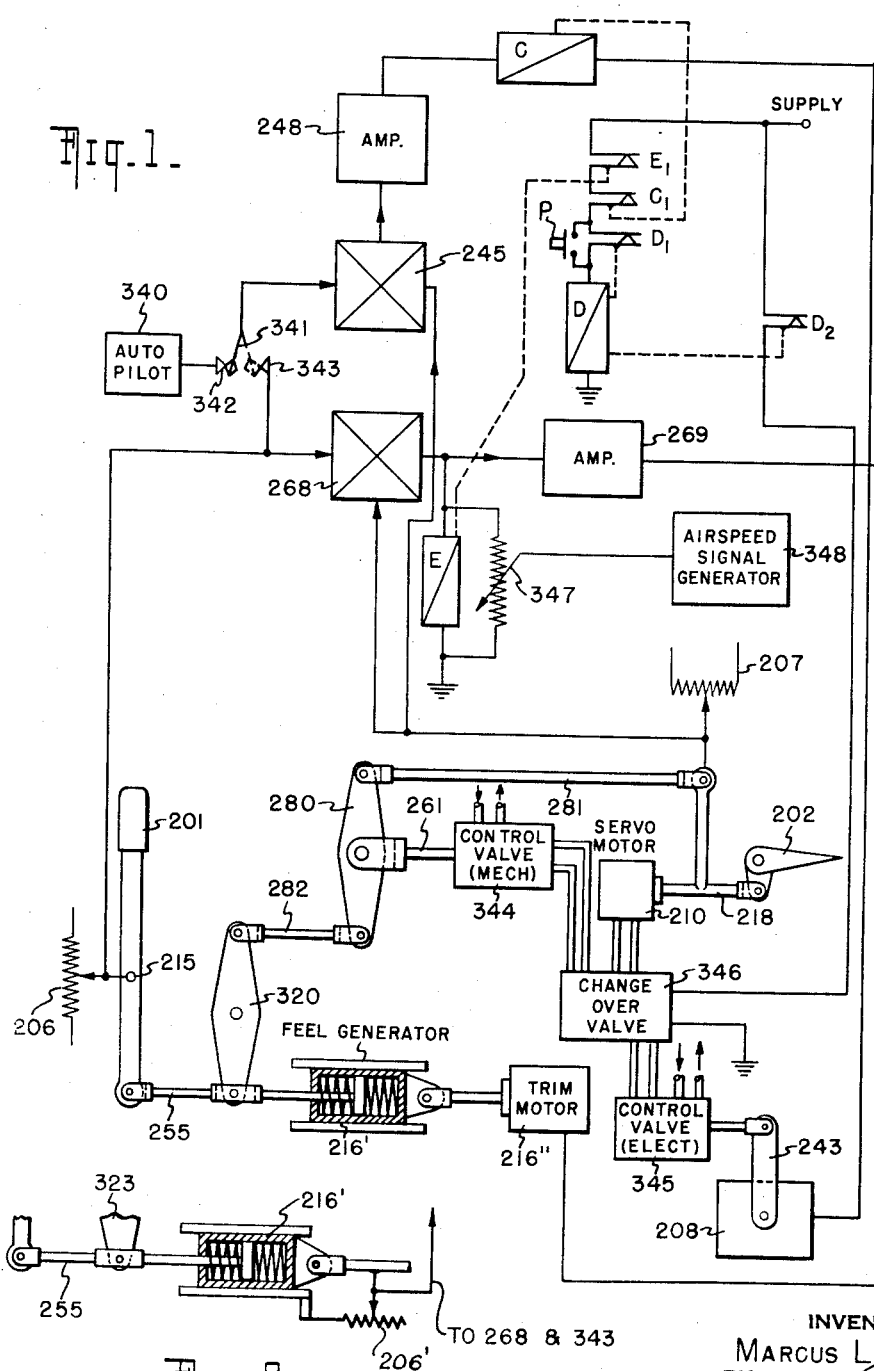

2,925,967
Patented Feb. 23, 1960

2,925,967

CONTROL SYSTEM FOR AIRCRAFT

Marcus Lionel Jofeh, Cranford, England, assignor to The Sperry Gyroscope Company Limited, Brentford, England, a company of Great Britain Application July 18, 1956, Serial No. 598,687

Claims priority, application Great Britain July 29, 1955

7 Claims. (Cl. 244—77)

This invention relates to control systems for aircraft and more particularly to protection arrangements for incorporation in such systems.

British application No. 32,002/52 claims a control system for an aircraft having a primary control surface and having means for producing an emergency signal when the control surface is displaced through a limiting angle defined by a settable quantity comprising means for setting the quantity in dependence on the output of means that computes a long term average of the control surface displacement and means for producing the emergency signal when the angular displacement of the control surface corresponds to the set quantity.

An object of the present invention is to provide a control system of this kind which may be particularly suited for combination with a control system as described in the prior U.S. application S.N. 495,143, filed March 18, 1955 for Control Systems for Aircraft by H. B. Sedgfield, W. R. Bohnel, A. P. Glenny and F. A. Summerlin.

According to the present invention an electrical signal is derived which represents the divergence of a control surface or the attitude of the craft about an axis from its long term average position, which signal is applied to a relay or the like that operates when the signal reaches a predetermined value to monitor the system.

Preferably the predetermined value is varied in dependence upon the air speed of the craft.

A system as described and claimed in the heretofore noted application No. 495,143 provides a control system having a normal mode of operation, which may be manual or automatic, and an emergency mode of operation which is manual only. There is also described therein a normal mode of operation which is electro-hydraulic and an emergency mode which is mechanico-hydraulic. In an emergency, such as excessive displacement of a control surface from a long term average value, it is desirable that the mode of control reverts to the emergency mode. In accordance with the present inventive concepts, this result is achieved through the monitored operation of a change-over valve that changes the mode of operation of the system from automatic pilot to manual controller.

The electrical signal representing the long term attitude of the craft or divergence of the control surface may be the difference signal between the output of a signal generator operatively connected to the control surface, which output is dependent upon the position of the control surface, and the output of a generator operatively connected to a manual controller which is positioned in accordance with the long term average position of the control surface during automatic control.

Alternatively the last-mentioned output may be obtained from a generator having a movable part operatively connected to the controller through an artificial feel device. When the latter arrangement is used the control system in accordance with the invention could be operative for automatic and manual control in the normal mode of operation.

In order that the invention may be readily carried into effect an embodiment, by way of example, is now described with reference to the accompanying drawing, in which Fig. 1 shows a schematic and integrated control system for an aircraft similar in many ways to that described in the heretofore noted application No. 495,143. Fig. 2 is a similar type of view of a modification of the system in which the generator at the controller end of the system is operatively connected thereto through a feel device.

A manual controller 201 is pivotally mounted on the aircraft structure about an axis 215 and extends below this axis to be attached mechanically via link 255 to an artificial-feel device 216' and to one end of a centrally pivoted lever 320. The other end of lever 320 is connected via link 282 to a mechanical differential 280 which comprises an output member 261 coupled to a hydraulic control valve 344. The mechanical differential 280 is also connected via link 281 to the output member 218 of a hydraulic servo motor 210. The output member 218 is coupled with a control surface 202 (e.g. elevator) of the aircraft.

Associated with the manual controller 201 there is a potentiometer 206. The voltage picked-off this potentiometer is fed as an input to an electrical differential or signal difference means 268 and to the contact 343. There is similarly provided a potentiometer 207 associated with the output member 218 of servo motor 210, the voltage from which is fed as an input to electrical differential or signal difference means 268 and electrical differential or signal difference means 245.

The pick-off voltages from potentiometers 206 and 207 are each dependent upon the position of the respective member with which it is associated. When the manual controller 201 and the output member 218 are in correspondingly equal positions the pick-off voltages are substantially equal.

In the dotted line position of a movable contact 341 the two pick-off voltages are fed to electrical differential 245, the differential result being amplified by amplifier 248 and supplied via relay C to a transducer 208 which comprises an arm 243 arranged to operate a hydraulic control valve 345. The arm 243 of transducer 208 is provided with a centre-zero position and is displaced in magnitude and sense according to the magnitude and sense of the signal applied to it.

A change-over valve 346 which is solenoid operated is provided to make hydraulic connection so that control valve 344 (hereinafter referred to as mechanical control valve 344 since it is associated with mechanical differential 280) controls servo motor 210 when the solenoid of valve 346 is unenergised and so that control valve 345 (hereinafter referred to as electrical control valve 345 since it is associated with the electrical differential 245 through transducer 208) controls servo motor 210 when the solenoid of valve 346 is energised.

The arrangement described provides two modes of operation, namely, the mechanico-hydraulic mode corresponding to the unenergised condition of changeover valve 346, and the electro-hydraulic mode corresponding to the energised condition of changeover valve 346. The full line position of the parts shown in Fig. 1 represents the system conditioned for automatic pilot operation.

In the mechanico-hydraulic mode manual controller 201 is moved against forces provided by feel device 216' (which is discussed later) and, through the mechanical connection provided by lever 320 and link 282, the lower end of the mechanical differential 280 is moved. Output member 261 operates the mechanical control valve 344 causing fluid from a high-pressure source (not shown) to operate servo motor 210. Besides moving the control surface 202, output member 218 of servo motor 210 feeds-back its motion, via link 281, to mechanical differential 280 and restores the mechanical control valve 344 to its zero position thereby cutting off the high-pressure fluid to servo motor 210. Thus servo motor 210 has moved control surface 202 by an amount corresponding to the movement of manual controller 201.

In the electro-hydraulic mode of operation changeover valve 346 is energised and the control of the system may be manual or automatic. For manual control the pick-off signal from potentiometer 206 is fed via contacts 343 and 341 to electrical differential 245 and for automatic control a signal is derived from an automatic pilot 340 and is fed to electrical differential 245 via contacts 342 and 341, contact 341 being changed to the full line position shown in the drawing. A change in the signal from potentiometer 206 due to movement of manual controller 201 or from automatic pilot 340 (whichever is in control) produces a difference signal from electrical differential 245, which difference signal, via amplifier 248, relay C and transducer 208, operates electrical control valve 345 causing high-pressure fluid to operate servo motor 210. Movement of output member 218 varies the pick-off signal from potentiometer 207 in such a sense as to reduce the difference signal. When the difference signal becomes zero, electrical control valve 345 returns to its original zero position and the fluid to servo motor 210 is cut off. Thus output member 218 of servo motor 210 has been moved an amount corresponding to the movement of manual controller 201 or movement dictated by automatic pilot 340 (whichever is in control).

For normal flight condition during the automatic electro-hydraulic mode of operation the lost motion in the mechanical connection of servo motor 210 to manual controller 201, is mainly provided by freedom of movement of the pivotal connection between the output member 261 and the mechanical differential 280. This lost motion is such that manual controller 201 is not moved by movement of output member 218 of servo motor 210. Manual controller 201 is moved to a long term average position by feel device 216', which device provides centralising forces on the manual controller by means of, for example, springs. The centralised position is varied by adjustment of feel device 216' by trim motor 216". Trim motor 216" is controlled by the amplified output of electrical differential 268 which has supplied to it the pick-off signal from the manual controller and the pick-off signal from the servo motor. Trim motor 216" is very slow running and therefore adjusts feel device 216' and manual controller 201 to long term average positions.

Thus as long as the movement of the control surface 202 lies within the lost motion of the connection to manual controller 201 the pick-off signal from potentiometer 206 represents the long term average position of the control surface or attitude of the craft about its axis. It follows that the difference signal from electrical differential 268 then represents the deviation of the control surface from this long term average position. When this difference signal reaches a predetermined value corresponding to the maximum permissible deviation of the control surface consistent with avoiding undue stressing of the aircraft structure it is desirable that a warning device or the like be operated.

In the present case, a monitoring relay E is connected to receive the output of electrical differential 268 and arranged to operate at a predetermined value or magnitude of this difference signal. Relay E opens contacts $E_1$ which are in series with contacts $C_1$ of relay C and self-holding contacts $D_1$ of relay D. Relay D is energised during electro-hydraulic control and by closing contacts $D_2$ of relay D causes the solenoid of changeover valve 346 to be energised to establish the electro-hydraulic mode. When contacts $E_1$ open, relay D becomes de-energised opening contacts $D_2$, de-energising the solenoid of changeover valve 346 and causing the system to revert to the mechanico-hydraulic mode which may be regarded as an emergency mode. To establish the electro-hydraulic mode of operation, in normal conditions, the contacts $D_1$ of the relay D may be short circuited momentarily by a push button P on the pilot's control panel.

The predetermined magnitude of the difference signal at which relay E operates is preferably varied in accordance with air speed, it being desirable to restrict the movements of the control surface more and more as the speed of the aircraft increases. For this purpose there is provided across relay E a variable shunt resistor 347, which is controlled by an air speed signal generator 348 in such a sense as to increase the sensitivity of relay E with increasing air speed.

Thus the amount of necessary movement of the control surface 202 from its long term average value to cause the system to revert to the mechanico-hydraulic mode decreases with increasing air speed.

The signal required to operate relay E at very low air speeds may be arranged to be in excess of the maximum difference signal obtainable (i.e., the difference signal corresponding to all the lost motion being taken up). Such an arrangement would enable large movements of the control surface at very low air speed to be made without the system reverting to the mechanico-hydraulic mode, which large movements are sometimes desirable and may be performed without causing excessive stress to the aircraft structure.

This protection circuit involving relay E is operative for both manual and automatic control in the electro-hydraulic mode but, of course, affords no protection during the mechanico-hydraulic mode. During manual electro-hydraulic control the difference signal supplied to relay E will not represent a departure of the control surface from a long term average but failure of servo motor 210 to follow the movement of manual controller 201.

Relay C provides further protection and is arranged to operate when a fault occurs which produces an excessive output from amplifier 248. Operation of relay C opens contact $C_1$ in series with relay D and causes the system to revert to the mechanico-hydraulic mode in a manner similar to that described with reference to relay E.

Fig. 2 shows an alternative arrangement for deriving a signal which corresponds to the long term average position of the control surface as provided by a potentiometer 206' in association with that portion of the feel device 216' which is coupled to trim motor 216" as disclosed in the prior U.S. application S.N. 525,682 for Control Systems for Aircraft, filed August 1, 1955 by H. B. Sedgfield, R. Hadekel, W. R. Bohnel and the inventor of the subject application.

A pick-signal provided in this way would represent the long term average position of the control surface with the possible advantage that the magnitude of the difference signal between this pick-off signal and the pick-off signal from servo motor 210 would not be limited to a value corresponding to the whole of the lost motion in the linkage, as is the case when a pick-off signal is taken from manual controller 201.

It will be appreciated that the potentiometer 206' may be replaced by other signal generators, such for example, as selsyns and the like.

What is claimed is:

1. In a combined manually operable and automatic pilot control system for aircraft; servo means for controlling the attitude of the craft about an axis; an automatic pilot and manual controller operatively connected to said servo means through a change-over valve settable to condition the system for operation by either the automatic pilot or the manual controller; means for setting said valve to condition the system for automatic pilot operation; means for positioning said controller in accordance with the long term attitude of the craft about its axis including signal difference means, means providing an input to said difference means in accordance with the output of the servo means, means providing a second input to said signal difference means operatively connected to the controller, and motive means driven by the output of said difference means and operatively connected to said controller through a feel device; monitoring means for changing the setting of said change-over valve to condition the system for operation by the manual controller, and means receiving the output of said signal difference means for operating said monitoring means when the output of the difference means exceeds a predetermined value.

2. A system of the character claimed in claim 1, including means for varying the cut-off point of operation of said output receiving means depending on the air speed of the craft.

3. A system of the character claimed in claim 1, in which said second input means is provided by a signal generator with a movable part operatively connected to said controller through the feel device.

4. In a combined manually operable and automatic pilot control system for aircraft; servo means for controlling the attitude of the craft about an axis; an automatic pilot and manual controller operatively connected to said servo means through a change-over valve settable to condition the system for operation by either the automatic pilot or the manual controller; means for setting said valve to condition the system for automatic pilot operation, a signal difference means receiving an input from the automatic pilot and an input in accordance with the output of the servo means of the system; and monitoring means receiving the output of said signal difference means operable when the output exceeds a predetermined value to change the setting of said change-over valve to condition the system for operation by the manual controller.

5. A system of the character claimed in claim 4, including means for positioning said controller in accordance with the long term attitude of the craft about its axis including second signal difference means, means providing an input to said second difference means in accordance with the output of said servo means, means providing a second input to said second signal difference means operatively connected to the controller, and motive means driven by the output of said second difference means and operatively connected to said controller through a feel device; and a second monitoring means receiving the output of said second signal difference means operable when the output exceeds a predetermined value to change the setting of said change-over valve to condition the system for operation by the manual controller.

6. In a combined manually operable and automatic pilot control system for aircraft; servo means for controlling the attitude of the craft about an axis; an automatic pilot and manual controller operatively connected to said servo means through a change-over valve settable to condition the system for operation by either the automatic pilot or the manual controller; signal difference means with an output operatively connected to said servo means, means providing an input to said difference means operatively connected to said controller, means providing a second input to said difference means in accordance with the output of said servo means; monitoring means for operating said change-over valve to condition the system for operation by the manual controller, and means receiving the output of said signal difference means for operating said monitoring means when the output of said difference means exceeds a predetermined value.

7. A combined manually operable and automatic pilot control system for aircraft including servo means for controlling the attitude of the craft about an axis; an automatic pilot and manual controller operatively connected to said servo means through a change-over valve settable to condition the system for operation by either the automatic pilot or the manual controller; means for setting said valve to condition the system for automatic pilot operation; signal difference means receiving an input from the automatic pilot and an input in accordance with the output of the servo means of the system; means for positioning said controller in accordance with long term attitude of the craft about its axis including second signal difference means, means providing an input to said second difference means in accordance with the output of the servo means, means providing a second input to said second difference means operatively connected to the controller, and motive means driven by the output of said second difference means and operatively connected to said controller through a feel device; means for changing the setting of said change-over valve to condition the system for operation by the manual controller, first monitoring means for operating said valve changing means when the output of said second signal difference means exceeds a predetermined value, and second monitoring means for operating said valve changing means when the output of said first signal difference means exceeds a predetermined value.

No references cited.